United States Patent [19]

Yamamoto et al.

[11] Patent Number: 4,479,036
[45] Date of Patent: Oct. 23, 1984

[54] ECHO CONTROL SYSTEM

[75] Inventors: Seiichi Yamamoto, Kokubunji; Seishi Kitayama, Tokyo, both of Japan

[73] Assignee: Kokusai Denshin Denwa Kabushiki Kaisha, Tokyo, Japan

[21] Appl. No.: 434,271

[22] Filed: Oct. 14, 1982

Related U.S. Application Data

[63] Continuation-in-part of Ser. No. 256,601, Apr. 22, 1981, abandoned.

[30] Foreign Application Priority Data

Apr. 28, 1980 [JP] Japan ................................ 55-55510

[51] Int. Cl.³ .............................................. H04B 3/20
[52] U.S. Cl. ................................................ 179/170.2
[58] Field of Search ............... 179/170.2, 170.6, 170.8; 370/29, 32

[56] References Cited

U.S. PATENT DOCUMENTS

| | | | |
|---|---|---|---|
| 3,836,734 | 9/1974 | Campanella et al. | 179/170.2 |
| 3,860,768 | 1/1975 | Wehrmann | 179/170.2 |
| 4,021,623 | 5/1977 | Suyderhoud et al. | 179/170.2 |
| 4,129,753 | 12/1978 | Duttweiler | 179/170.2 |

*Primary Examiner*—G. Z. Rubinson
*Assistant Examiner*—Randall P. Myers

*Attorney, Agent, or Firm*—Robert E. Burns; Emmanuel J. Lobato; Bruce L. Adams

[57] ABSTRACT

An echo control system for an adaptive echo canceller which forms a pseudo-echo or its residual signal by combining respective outputs from a tapped delay line holding an estimated characteristic of an echo path as a tap weight and receiving a received signal or its residual signal as an input signal, subtracts the pseudo-echo or its residual signal from an echo signal or its residual signal, and corrects the tap weight using an amount of correction obtained by the resulting residual echo signal or its residual signal and the received signal or its residual signal. In accordance with the invention, there are provided a circuit noise estimation circuit for estimating a circuit noise of the echo path, a parameter error estimation circuit for estimating a parameter error between the characteristic of the echo path and its estimated characteristic, and a coefficient calculator for determining a correction coefficient obtained with the circuit noise, the parameter error and the received signal, wherein the said tap weight is corrected in accordance with the result of multiplication of the amount of correction and the correction coefficient. The system may be further provided with a device for transferring, as the said tap weight, the tap weight of the tapped delay line in the circuit noise estimation circuit when the circuit noise formed in the circuit noise estimation circuit is smaller than the residual echo signal.

2 Claims, 5 Drawing Figures

Fig. I even modification is 4,479,036

ECHO CONTROL SYSTEM

CROSS REFERENCE TO RELATED APPLICATION

This application is a continuation-in-part of our co-pending application Ser. No. 256,601, filed on Apr. 22, 1981 and now abandoned.

BACKGROUND OF THE INVENTION

The present invention relates to an adaptive echo canceller which cancels an echo while estimating the transmission characteristic of an echo path through the use of a received signal and an echo signal.

The principle of an echo canceller is to estimate the transmission characteristic of an echo path using a received signal and an echo signal, form a pseudo-echo signal on the basis of the estimation result and subtract the pseudo-echo signal from a true echo signal, thereby cancelling an echo. The echo canceller basically excels conventional echo suppressors but has a defect that since it successively estimates the transmission characteristic of the echo path, a misestimation is likely to occur when the noise level of a signal or the like of a near-end talker is high relative to an echo signal level as in a case of double talking.

To avoid such a defect, there have been proposed a method using a double talking detector and a method which employs two echo path models, successively corrects only one of the models and sets, as a new echo path model, the model with a smaller error signal (Kazuo Ochiai, et al: "Echo Canceller with Two Echo Path Models", IEEE Trans Vol. COM-25, No. 6, June 1977, pp. 589-595). The former is an application to an echo canceller of a device widely employed in echo suppressors, but the detector of this method is basically insufficient in sensitivity and poses a problem that a misestimation is already formed before a double talking is detected. In contrast thereto, the latter exhibits a relatively excellent characteristic even in a case of double talking but has the drawback that it cannot follow up a gentle variation in the SN ratio.

BRIEF SUMMARY OF THE INVENTION

An object of the present invention is to provide an echo control system which successively estimates circuit noise and a parameter error of an echo path model and successively changes a step gain $\alpha$ concerning the estimation of the model using the estimated values, thereby to permit echo cancellation not only during the double talking but also when the SN ratio changes slowly.

To attain the above object of the invention, there is provided an echo control system for an adaptive echo canceller which forms a psuedo-echo by performing a convolution calculation with a first function signal indicative of a received signal and a second function signal indicative of an estimated characteristic of an echo path, subtracts the pseudo-echo signal from an echo for developing a residual echo signal, and corrects the estimated characteristic using an amount of correction obtained by the residual echo signal, the first function signal and a correction coefficient signal characterized by a circuit receptive of the first function signal and connected to the echo path noise estimation circuit for estimating circuit noise of the echo path, a parameter error estimation circuit receptive of the second function signal for estimating a parameter error between the characteristic of the echo path and its estimated characteristic, and a coefficient calculator receptive of the first function signal, the circuit noise and the parameter error for determining the correction coefficient obtained with the circuit noise, the parameter error and the received signal, wherein the said estimated characteristic of the echo path is corrected in accordance with the result of multiplication of the amount of correction and the correction coefficient.

The system may be further provided with means for transferring, as the said estimated characteristic of the echo path an estimated characteristic value in the circuit noise estimation circuit when the circuit noise formed in the circuit noise estimation circuit is smaller than the residual echo signal.

BRIEF DESCRIPTION OF THE DRAWINGS

The invention will be described in detail below with reference to the accompanying drawings, in which.

DETAILED DESCRIPTION

Figure 1:
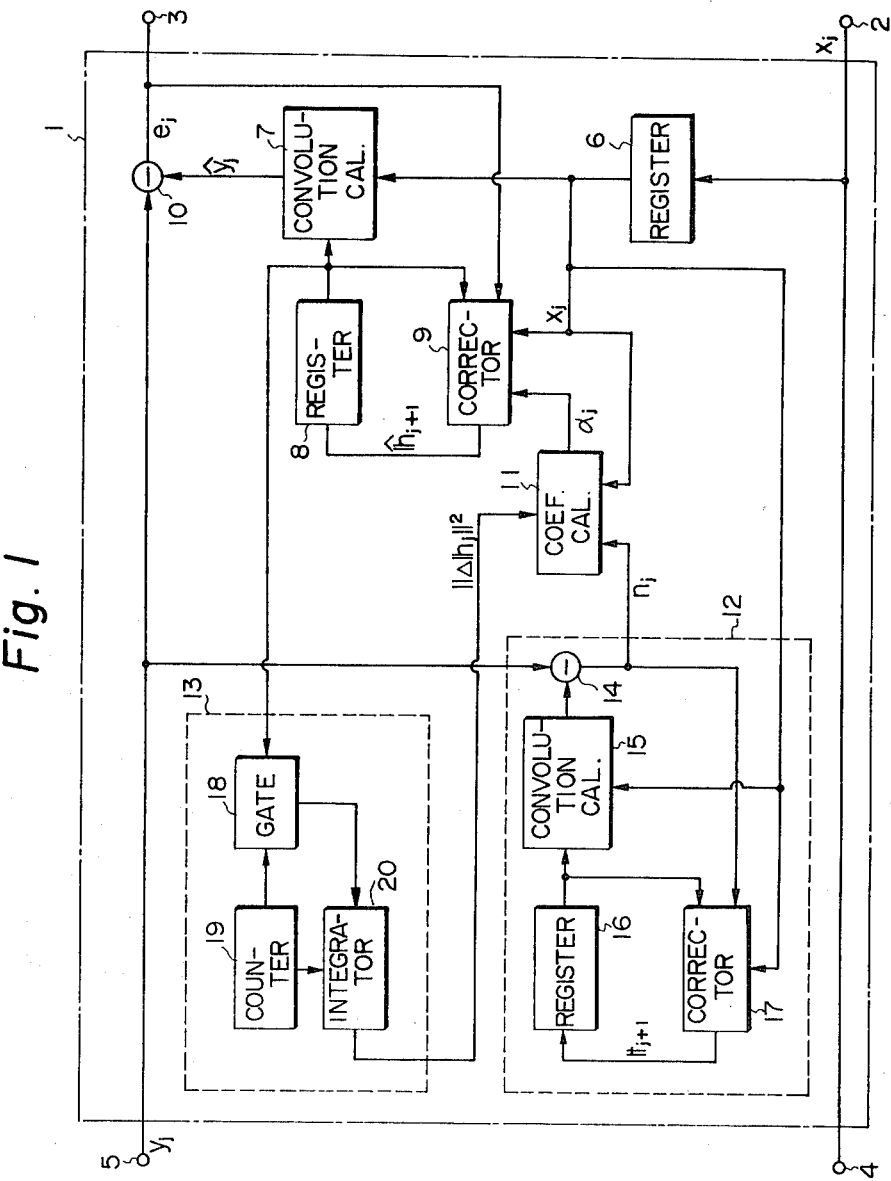
FIG. 1 is a block diagram illustrating an embodiment of an echo canceller of the present invention.

The principle of the invention will first be described.

Now, let an impulse response h(t) of an echo path and a received signal x(t) of a first function signal be respectively represented by $$|h = (h_0, h_1, \ldots h_{N-1})' \quad (1)$$

$$\overset{*}{x}_j = (x_j, x_{j-1}, \ldots x_{j-(N-1)})' \quad (2)$$

and let an estimated value of $|h$ at a moment jT be represented as a second function signal by $$|\hat{h}_j = (\hat{h}_0, \hat{h}_1, \ldots \hat{h}_{N-1})' \quad (3)$$

In accordance with the learning identification method which is an identification algorithm usually employed in echo cancellers, the estimated value $|\hat{h}_{j+1}$ is given by $$|\hat{h}_{j+1} = |\hat{h}_j + \alpha \frac{\overset{*}{x}_j e_j}{\|\overset{*}{x}_j\|^2} \quad (4)$$

where $\alpha$ is a constant such that $0 < \alpha < 2$.

In a case where circuit noise is negligible, a step gain $\alpha = 1$ provides the most excellent convergence characteristic but when the circuit noise is not negligible, the following step again $\alpha_j$ $$\alpha_j = \frac{1}{1 + \frac{E[n_j^2]}{E[x_j^2]} \cdot \frac{1}{\|\Delta|h_j\|^2}} \quad (5)$$

that is, $$|\hat{h}_{j+1} = |\hat{h}_j + \alpha_j \frac{\overset{*}{x}_j e_j}{\|\overset{*}{x}_j\|^2} \quad (6)$$

is optimum in almost all cases, where $E[x_j^2]$ is an expected value of $x_j^2$. $E[n_j^2]$ shows an expected value of the power of the circuit noise at the moment jT and a parameter error $||\Delta|h_j|||^2$ is defined by $||\Delta|h_j|||^2=||(|h-|\hat{h}_j)||^2$.

Of the parameters in the expression (5), the input signal level $x_j^2$ is directly measurable but the circuit noise level $n_j^2$ and the parameter error $||\Delta|h_j|||^2$ are not directly measurable and hence must be estimated.

Now, letting another estimated value $|t_j$ of the impulse response of the echo path be represented by $$|t_j=(t_0, t_1, \ldots, t_{N-1})' \quad (7)$$

an estimated value $\hat{n}_j^2$ of the circuit noise can be obtained by the following recurrence formula:

$$|t_{j+1} = |t_j + \frac{x_j}{||x_j||^2}(z_j - x_j'|t_j) \quad (8)$$

where $z_j$ is a value that a circuit noise $n_j$ is superimposed on an echo $y_j$, that is, $z_j = y_j + n_j$.

Setting $\Delta|t_j \triangleq |t_{j+1} - |t_j$, is follows that $$\Delta|t_j = \frac{x_j}{||x_j||^2}(z_j - x_j'|t_j) \quad (9)$$

obtaining expected values of squares of the both sides, if $n_j$ and $x_j$ are considered to be white noises and uncorrelated, it follows that $$E[||\Delta|t_j||^2] = E\left[\frac{1}{||x_j||^2}\Delta\omega_j'x_jx_j'\Delta\omega_j + n_j^2\right] \quad (10)$$

where $\Delta\omega_j = |h - t_j$. Accordingly, for a sufficiently large value of $j$, it follows that $$E[||\Delta|t_j||^2] = \frac{1}{2N} \cdot \frac{E[n_j^2]}{E[x_j^2]} \quad (11)$$

Thus it is possible to estimate the magnitude of the circuit noise using the input signal $x_j$ and the impulse response $|t_j$ of the echo path. Usually a voice signal is not regarded as white noise but it can easily be rendered into white noise by the methods proposed in Japanese patent application No. 57129/78 "Echo Control System" and No. 165196/78 "Echo Control System" filed previously.

It is also possible to use, as an estimated value of a circuit noise, a signal from an input terminal of the transmitting side instead of the above. In this case, the convergence characteristic is degraded as compared with that in the case of the above-described system but since a register for indicating $|t_j$ and a convolution calculation become unnecessary, there is the effect that the amount of hardware used is reduced.

The parameter error $||\Delta|h_j|||^2$ can be estimated in the manner described below.

Now, let the impulse response characteristic $|h$ of the echo path be represented by $$|h=(h_0, h_1, \ldots h_N)' \quad (12)$$

as described previously and let a function $|h^*$ be newly defined as follows:

$$|h^*=(0', |h')'=(0, \ldots, 0'h_0, \ldots, h_N)' \quad (13)$$

On the other hand, an estimated value of the function $|h^*$ at the moment $jT$ $$|\hat{h}_j^* = (\hat{h}_{-M}, \ldots, \hat{h}_{-1}, \hat{h}_0, \ldots, \hat{h}_N)' \quad (14)$$
$$= ((-)|\hat{h}, |\hat{h})'$$

is similarly given, according to the learning identification method which is an identification algorithm usually employed in echo cancellers, by $$|\hat{h}_{j+1}^* + |\hat{h}_j^* + \alpha \frac{x_j^* e_j}{||x_j^*||^2} \quad (15)$$

where $\alpha$ is an error correction coefficient but $0 < \alpha \leq 1$, $x_j^*(x_{j+M}, \ldots, x_{j+1}, x_j, x_{j-1}, \ldots x_{j-N})'$ and $e_j = y_j - x_j^{*'}|\hat{h}_j^*$. Setting approximate accuracies of the model in the time-lag and time-lead portions of the impulse response characteristic as follows:

$$(+)e_j^2 = |||h_j - |h||^2 \quad (16)$$

$$(-)e_j^2 = ||(-)|h_j - 0||^2 \quad (17)$$

it follows that $$\overline{(-)e_{j+1}^2} \simeq \left(1 - \frac{2\alpha}{N} + \frac{\alpha^2(M+2)}{N(N+2)}\right)\overline{(-)e_j^2} + \frac{\alpha^2 M}{N(N+2)}\overline{(+)e_j^2} + \frac{M\alpha^2}{N}\overline{n_j^{*2}} \quad (18)$$

and that $$\overline{(+)e_{j+1}^2} \simeq \left(1 - \frac{2\alpha}{N} + \frac{\alpha(M+2)}{N(N+2)}\right)\overline{(+)e_j^2} + \frac{\alpha^2 M}{N(N+2)}\overline{(-)e_j^2} + \frac{M}{N}\overline{n_j^{*2}} \quad (19)$$

where $$\overline{n_j^{*2}} = \overline{\left(\frac{n_j}{||x_j||^2}\right)^2}$$

A limit value is approximately given by $$\lim_{j \to \infty}\overline{(+)e_j^2} \simeq \frac{N}{M}\lim_{j \to \infty}\overline{(-)e_j^2} \quad (20)$$

Since $(-)e_{j+1}^2$ is as defined by the expression (17) and is measurable at all times, $$\overline{(+)e_{j+1}^2} = |||\hat{h}_{j+1} - |h||^2,$$

that is, the magnitude of a parameter error can be estimated on the basis of the expression (20).

With the principles described above, it is possible to obtain an excellent cancellation characteristic by changing the step gain $\alpha_j$ on the basis of the estimated values of the circuit noise and the identification error not only during the overlap talking but also while the SN ratio undergoes gentle changes. Furthermore, as is evident from the expression (17), the present system is capable of following up gentle variations of the echo path as well. In a case where the echo path rapidly changes, however, the present system poses some problems in the follow-up characteristic. For the solution of them, there are two methods described below.

A first one of them is a method in which the value of the parameter error is selected to be constant, for example, in the range of $10^{-1}$ to $10^{-2}$ taking into account an echo loss of an ordinary echo path. With this method, the arrangement used is simple and a relatively excellent followup characteristic can be obtained but there is the defect that the convergence characteristic is degraded when the parameter error is large as in a case where the echo path is changed over. The other method is one in which a residual echo of the echo canceller proper and a residual echo of a circuit noise estimation circuit are compared with each other and, when the latter is larger than the former, the tap weight of a tapped delay line in the circuit noise estimation circuit is transferred as the tap weight of a tapped delay line of the echo canceller proper, thereby to correct values of parameters of an echo path model. With this method, the arrangement used becomes somewhat complex as compared with the arrangement for the abovesaid method but even a sudden change as is caused by the change-over of the echo path can be followed up. This method is subject to the limitation that the measurement be made and the tap weight be transferred only at the time when the SN ratio is relatively good in the relation between the residual echoes and the near-end talker and that the tap weight be transferred. However, since the time during which the SN ratio is very poor as in the case of double talking is extremely short as compared with the double talking time, the above-said limitation scarcely presents a problem.

The above is the gist of the present invention.

With reference to the accompanying drawings, the present invention will hereinafter be described in detail.

FIG. 1 is a block diagram illustrating the arrangement of an embodiment of the echo canceller using the present invention. Reference numeral 1 indicates an echo canceller; 2 designates an input terminal of the receiving side; 3 identifies an output terminal of the transmitting side; 4 denotes an output terminal of the receiving side; 5 represents an input terminal of the transmitting side; 6 represents a register; 7 refers to a convolution calculator comprising a tapped delay line such as a transveral filter; 8 indicates a register; 9 designates a corrector; 10 identifies a subtractor; 11 denotes a coefficient calculator; 12 represents a circuit noise estimation circuit; 13 shows a parameter error estimation circuit; 14 refers to a subtractor; 15 indicates a convolution calculator; 16 designates a register; 17 identifies a corrector; 18 denotes a gate; 19 represents a counter; and 20 represents a square integrator. For convenience of description, let it be assumed that signals are digitized ones in the echo canceller 1 and, though not shown in FIG. 1, clock pulses are supplied to respective parts of the echo canceller.

A description will be given of the operation of the echo canceller. A received signal $x_j$ supplied from the input terminal 2 of the receiving side is applied to the output terminal 4 of the receiving side but a part of the received signal is returned as an echo $y_j$ to the input terminal 5 of the transmitting side. In the echo canceller 1, the signal $x_j$ is applied to the register 6. The received signal $x_j$ from the register 6 is applied to the convolution calculator 7, in which it is subjected to a convolution calculation with an estimated value of an impulse response in the register 8, and the calculation result is transferred as a pseudo-echo signal $y_j$ to the subtractor 10. In the subtractor 10, a residual echo signal $e_j$, which is a difference signal between the echo signal $y_j$ from the input terminal 5 of the transmitting side and the pseudo-echo signal $\hat{y}_j$, is formed and the residual echo signal is transferred to the output terminal 3 of the transmitting side and the corrector 9. In the corrector 9, a new estimated value $|h_{j+1}|$ is formed according to the expression (6) above using the signal $x_j$ which is transferred from the register 6, a coefficient $\alpha_j$ which is transferred from the coefficient calculator 11 and the residual echo $e_j$, and the estimated value thus obtained is transferred to the register 8. In this case, the coefficient calculator 11 determines the coefficient $\alpha_j$ according to the expression (5) using an estimated noise $n_j$ which is transferred from the circuit noise estimation circuit 12 and a parameter error $||\Delta|h_j||^2$ which is transferred from the parameter error estimation circuit 12.

Next, a detailed description will be given of the circuit noise estimation circuit 12 and the parameter error estimation circuit 13. In the circuit noise estimation circuit 12, the signal $x_j$ which is transferred from the register 6 is subjected to a convolution calculation with a signal from the register 16 in the convolution calculator 15, and the calculation result is transferred to the subtractor 14. In the subtractor 14 is produced a difference signal between the output from the convolution calculator 15 and the signal from the input terminal 5 of the transmitting side, and the difference signal is transferred to the coefficient calculator 11 and the corrector 17. In the corrector 17 a new estimated value $|t_{j+1}|$ is formed according to the expression (8) using the signal from the register 16 and the difference signal from the subtractor 14.

In the parameter error estimation circuit 13 the gate 18 is opened and closed in accordance with the counting state of the counter 19, by which only a predetermined portion of a signal transferred from the register 8 is transferred to the square integrator 20. The square integrator 20 integrates the square of the signal transferred from the gate 18 and a value which is obtained by multiplying the integration result by (N/M) according to the expression (20) is transferred as a parameter error to the coefficient calculator 11. Thereafter the value in the square integrator 20 is reset in accordance with the signal from the counter 19.

In a case where a fixed value is selected as the identification error, it is a matter of course that the signal from the parameter error estimation circuit 13 to the coefficient calculator 11 is set to a fixed value.

Figure 2:
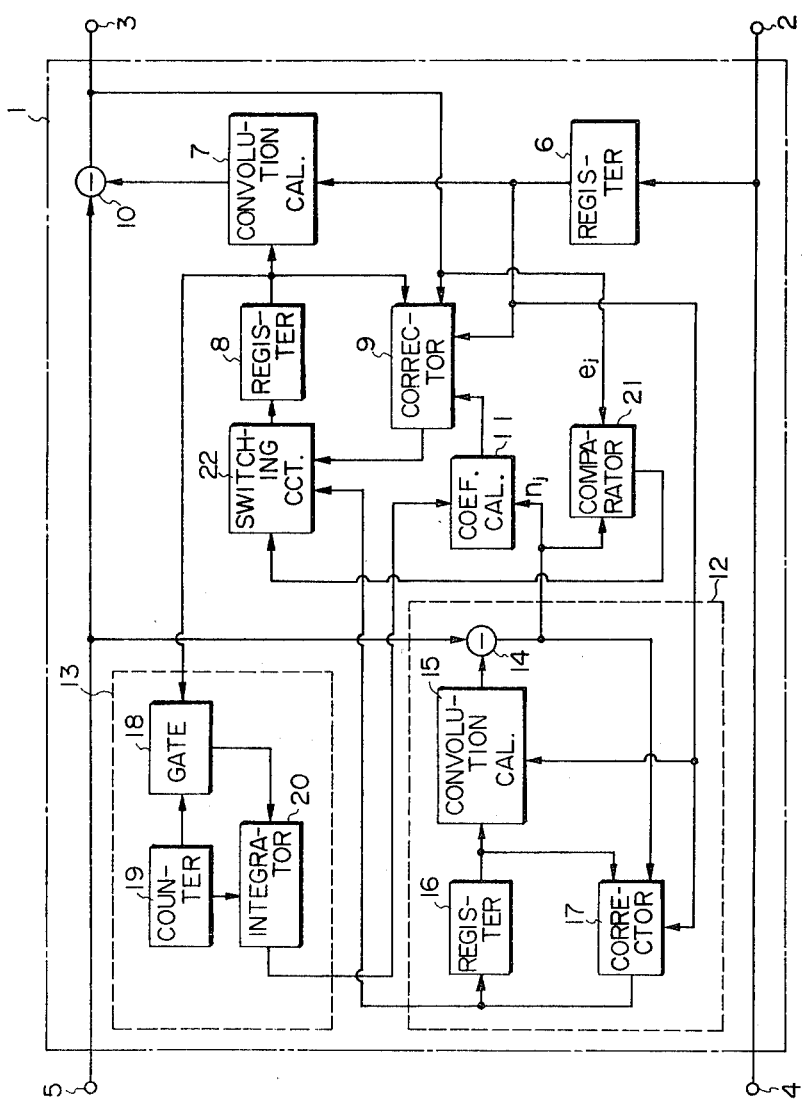
FIG. 2 is a block diagram showing another embodiment of the present invention.

FIG. 2 illustrates another embodiment of the present invention. In FIG. 2 the same reference numerals as those in FIG. 1 indicate the parts having the same functions as in FIG. 1. Reference numeral 21 designates a comparator and 22 identifies a switching circuit. The illustrated embodiment will hereinbelow be described in detail. Since the embodiment of FIG. 2 is almost identical in construction with the embodiment of FIG. 1, a description will be given of differences between them for the sake of brevity. The power of the difference signal $n_j$ from the subtractor 14 in the circuit noise estimation circuit 12 and the power of the residual echo $e_j$ are compared with each other by the comparator 21 and, when the value obtained by dividing the power of the residual echo $e_j$ by the power of the difference signal is larger than a predetermined value, the comparator 21 changes over the switching circuit 22 to transfer the signal from the corrector 17 to the register 8 instead of the signal from the corrector 9. Compared with the embodiment of FIG. 1, the embodiment of FIG. 2 is free from a defect of the former that an error in the estimation of the parameter error at the start of convergence becomes very large to decrease the convergence rate; the amount of hardware used increases a little but the overall characteristics are improved as compared with those of the embodiment of FIG. 1.

The embodiment of FIG. 2 adopts the system that transfers the content of the register 16 in the circuit noise estimation circuit 12 when the error in the estimation of the parameter error has become large. It is also possible, however, to employ such a system in which when the estimation error has become large, the coefficient value from the coefficient determining circuit 11 is set to a predetermined value, for example, "1", thereby to increase the convergence rate.

Furthermore, the embodiment of FIG. 2 employs the system of comparing a residual echo signal with a residual echo signal in the circuit noise estimation circuit 12 for the detection of a large error in the estimation of the parameter error. It is also possible, however, the adopt such a system in which the product of an estimated value $$\frac{N}{M} \overline{(-)e_j^2}$$

of the parameter error and the power $||\bar{x}_j||^2$ of a received signal is compared with the residual echo signal and when $||\Delta|h|\,|^2 \cdot ||\bar{x}_j||^2$ is smaller than the residual echo signal, the coefficient value from the coefficient determining circuit is set to a predetermined value, for example, "1". The principle of this system is considered as described below.

Assuming that the received signal $x_j$ is white noise, the power of the residual echo signal $e_j$ is regarded as follows:

$$e_j^2 = ||\Delta|h_j|\,|^2 ||\bar{x}_j||^2$$

Accordingly, if the value of $$\frac{N}{M} \overline{(-)e_j^2} \; ||\bar{x}_j||^2$$

is appreciably smaller than $e_j^2$, then an error in the estimation of $$\overline{(-)e_j^2}$$

may be considered large.

Moreover, if the present invention is combined with means for whitening the received signal by linear prediction as referred to previously, then the accuracy of the estimation of the circuit noise is enhanced to improve the convergence characteristic and the amount of cancellation, as compared with the case of using the voice signal itself.

It is possible, of course, to apply to the two embodiments described in the foregoing techniques by which the sums of the estimated circuit noise $n_j^2$, the power of the residual echo $e_j$ and the power of the difference signal to be compared by the comparator 21 are each obtained over a predetermined number to thereby smoothen an abrupt change which would occur when they take individual values.

A further detailed description will be given of the parameter error estimation circuit 13, the corrector 9 and the coefficient calculator 11.

Figure 3:
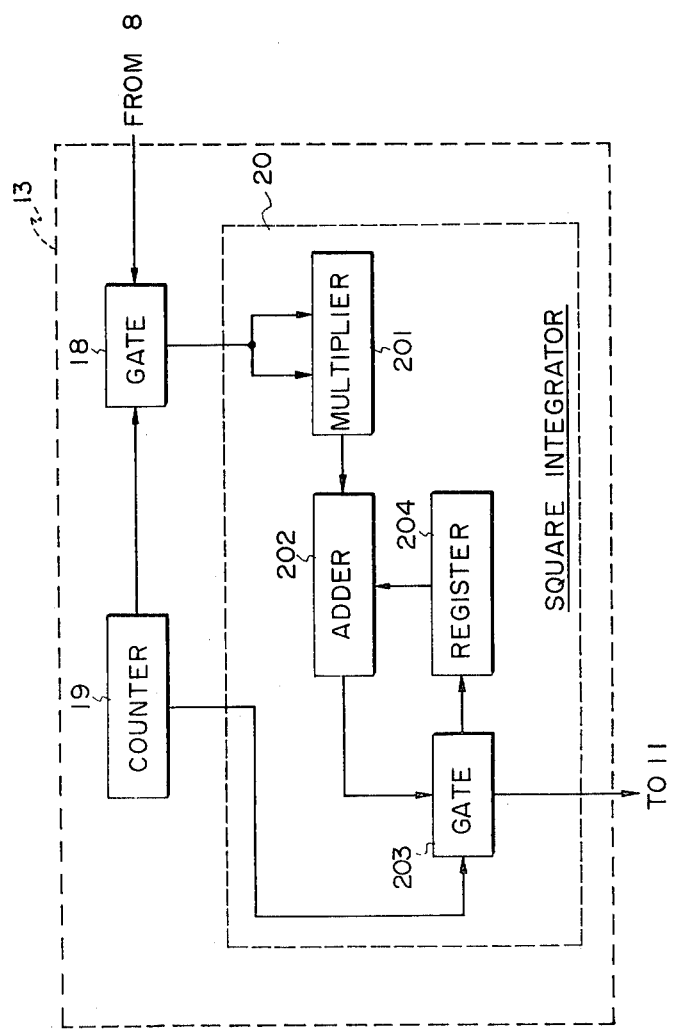
FIGS. 3, 4 and 5 are block diagrams illustrating examples of circuits used in this invention.

FIG. 3 illustrates an example of the parameter error estimation circuit. Reference numeral 18 indicates a gate; 19 designates a counter; 20 identifies a square integrator; 201 denotes a multiplier; 202 represents an adder; 203 represents a gate; 204 refers to a register. Through the gate 18 which is controlled by the counter 19, only a predetermined fixed number of pulses from the register 8 are transferred to the multiplier 201 in the square integrator 20, so that a square of each block of pulses is calculated. In the adder 202, the output of the multiplier 201 is added to the signal of the register 204, and through the gate 203 the sum signal is applied to the register 204. By repeating the above operations, the sum of the squares of the signals is calculated. When the sum of the predetermined fixed number of the signals is thus calculated, the gate 203 which is controlled by the counter 19 transfer the output of the adder 202 to the coefficient calculator 11.

Figure 4:
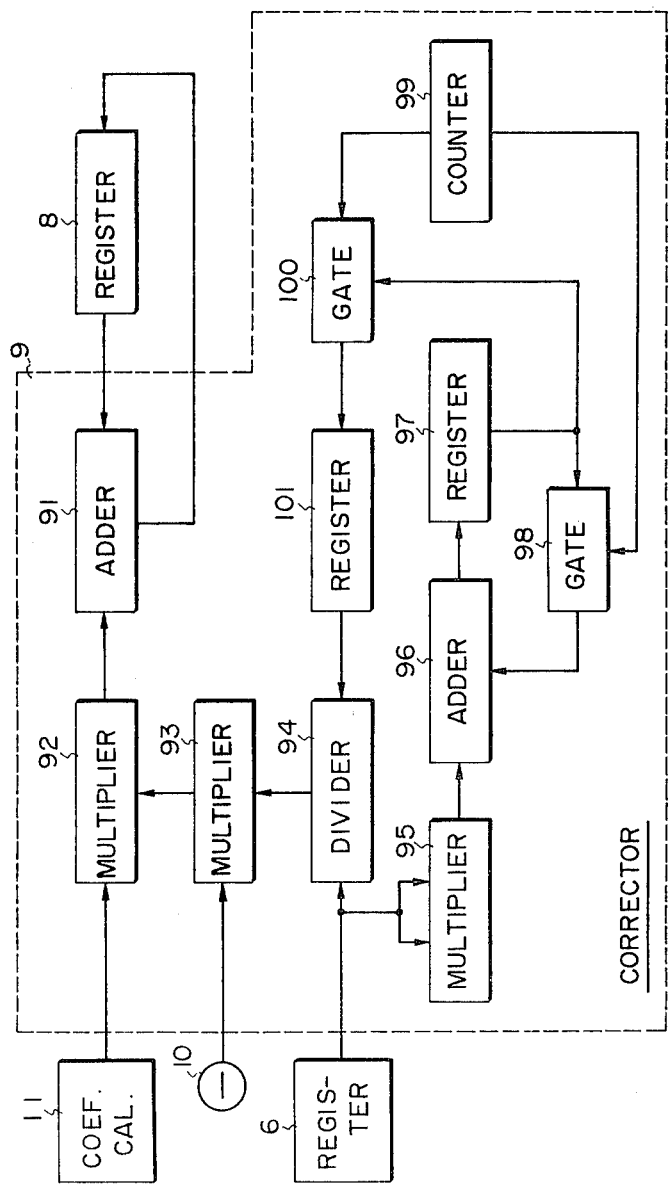

FIG. 4 illustrates an example of the corrector 9. The corrector 17 can be formed similarly as this arrangement of the corrector 9. Reference numeral 91 indicates an adder; 92 and 93 identify multipliers; 94 denotes a divider; 95 represents a multiplier; 96 identifies an adder; 97 refers to a register; 98 indicates a gate; 99 designates a counter for generating clock pulses at regular intervals; 100 identifies a gate; and 101 denotes a register.

The signal $x_j$ transferred from the register 6 is applied to both the divider 94 and the multiplier 95. The square of the signal $x_j$, $x_j^2$ is produced in the multiplier 95 and transferred to the adder 96. In the adder 96, the signal $x_j^2$ is added to the signal in the register 97, so that the result is stored to the register 97. Accordingly, the sum $\Sigma x_j^2$ of the squares of the signals $x_j$ is calculated in the adder 96. The gate 100 which is controlled by the counter 99 supplies the signal $\Sigma x_j^2$ of the register 97 through the register 101 to the divider 94. In the divider 94, the signal $x_j$ is divided by $\Sigma x_j^2$, and the calculation result $x_j/\Sigma x_j^2$ is transferred to the multiplier 93. Using the signal transferred from the divider 94 and the signal $e_j$ supplied from the subtractor 10, the signal of $x_j e_j/\Sigma x_j^2$ is produced by the multiplier 93 and applied to the multiplier 92. Using the signal applied from the multiplier 93 and the signal $\alpha_j$ determined by the coefficient calculator 11, the multiplier 92 produces the signal of $\alpha_j x_j e_j/\Sigma x_j^2$, which is applied to the adder 91. The adder 91 adds the signal $\alpha_j x_j e_j/\Sigma x_j^2$ applied from the multiplier 92 to the signal from the register 8, and the addition result is returned to the register 8. Thus, the signal in the register 8 is corrected.

Figure 5:
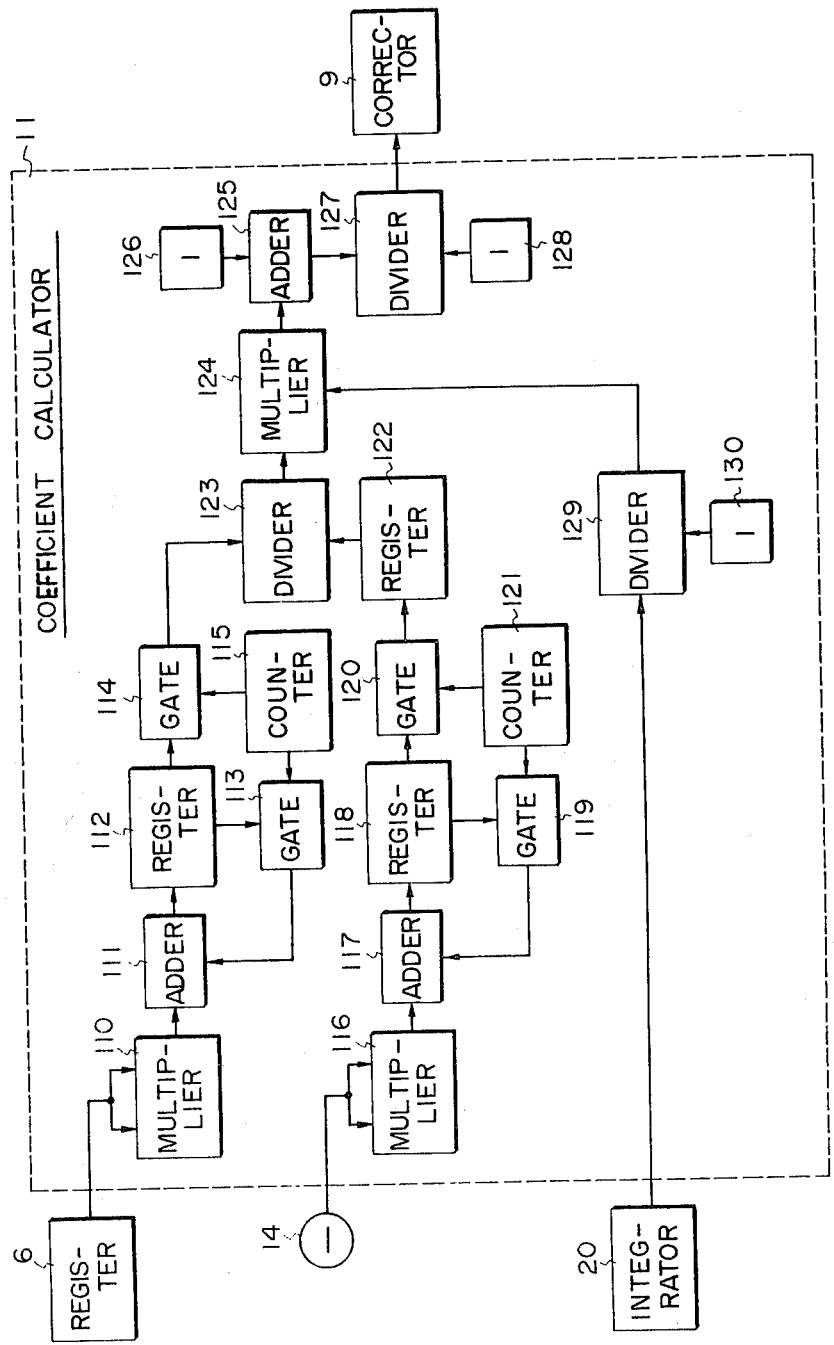

FIG. 5 illustrates an example of the coefficient calculator 11. Reference numeral 110 indicates a multiplier; 111 designates an adder; 112 identifies a register; 113 and 114 denote gates; 116 represents a counter for generating clock pulses at regular intervals; 116 represents a multiplier; 117 refers to an adder; 118 indicates a register; 119 and 120 designate gates; 121 identifies a counter; 122 denotes a register; 123 represents a divider; 124 identifies a multiplier; 125 refers to an adder; 126 indicates a constant generator; 127 designates a divider; 128 identifies a constant generator; 129 denotes a divider; and 130 represents a constant generator.

The signal $x_j$ transferred from the register 6 is applied to the multiplier 11, in which a square $x_j^2$ of the signal $x_j$ is produced and applied to the adder 111. In the adder 111, the signal from the register 112 which is transferred through the gate 113 is added to the signal $x_j^2$, so that the addition result is returned to the register 112. In this way, the sum $\Sigma x_j^2$ of signals $x_j^2$ is calculated in the adder 111. The signal $\Sigma x_j^2$ in the register 112 is transferred to the divider 123 through the gate 114 which is controlled by the counter 115. On the other hand, the signal $n_j$ transferred from the subtractor 14 is treated in the same way by the arrangement of the multiplier 116, the adder 117, the register 118, the gate 119, the gate 120 and the counter 121, and the signal $\Sigma n_j^2$ is stored to the register 122. The signal $\Sigma n_j^2$ in the register 122 is applied to the divider 123, in which $\Sigma n_j^2/\Sigma x_j^2$ is produced. Furthermore, the signal $||\Delta h_j||^2$ transferred from the square integrator 20 is applied to the divider 129 in which $1/||\Delta h_j||^2$ is produced and transferred to the multiplier 124. In the multiplier 124, the product $(\Sigma n_j^2/\Sigma x_j^2)(1/||\Delta h_j||^2)$ is produced using the signals from the divider 123 and the divider 129 and applied to the adder 125. In the adder 125, the product signal and a signal "1" supplied from the constant generator 126 are added, so that the addition result is applied to the divider 127. In the divider 127, using the signal from the adder 125 and the signal from the constant generator 128 a correction coefficient $$\alpha_j = \frac{1}{1 + \frac{\Sigma n_j^2}{\Sigma x_j^2} \cdot \frac{1}{||\Delta h_j||^2}}$$

is produced and transferred to the corrector 9.

The present invention provides an echo control system which is capable of performing its function even in the case of double talking and in the case of the SN ratio gently changing and which exhibits an excellent cancellation characteristic with simple control. Although the foregoing embodiments have been described in connection with the case of using the received signal $x_j$ itself as an input signal to the echo path model of the echo canceller, the present invention is applicable to the case of employing, instead of the received signal $x_j$, a residual signal $x_j$ of the received signal as the input signal to the echo path model of the echo canceller, as described in the aforesaid prior applications, Japanese patent application No. 57129/78 "Echo Control System" and No. 165196/78 "Echo Control System"; and in such a case, the accuracy of the estimated value of the circuit noise is raised, resulting in the convergence characteristic and the amount of cancellation being improved, as described previously. In this case, the residual signal of the received signal is employed in place of the received signal as mentioned above and use is made of residual signals of the echo signal and the residual echo signal instead of them.

What we claim is:

1. An echo control system for an adaptive echo canceller which forms a pseudo-echo by performing a convolution calculation with a first function signal indicative of a received signal and a second function signal indicative of an estimated characteristic of an echo path, substracts the pseudo-echo from an echo signal for developing a residual echo signal, and corrects the estimated characteristic using an amount of correction obtained by the residual echo signal, the first function signal and a correction coefficient signal characterized by a circuit noise estimation circuit receptive of the first function signal and connected to the echo path for estimating a circuit noise of the echo path, a parameter error estimation circuit receptive of the second function signal for estimating a parameter error between the characteristic of the echo path and its estimated characteristic, and a coefficient calculator receptive of the first function signal, the circuit noise and the parameter error for determining the correction coefficient signal obtained with the circuit noise, the parameter error and the received signal, wherein the said estimated characteristic of the echo path is corrected in accordance with the result of multiplication of the amount of correction and the correction coefficient.

2. An echo control system for an adaptive echo canceller which forms a pseudo-echo by performing a convolution calculation with a first function signal indicative of a received signal and a second function signal indicative of an estimated characteristic of an echo path, subtracts the pseudo-echo from an echo signal for developing a residual echo signal and corrects the estimated characteristic using an amount of correction obtained by the residual echo signal, the first function signal and a correction coefficient signal characterized by a circuit noise estimation circuit receptive of the first function signal and connected to the echo path for estimating a circuit noise of the echo path, a parameter error estimation circuit receptive of the second function signal for estimating a parameter error between the characteristic of the echo path and its estimated characteristic, a coefficient calculator receptive of the first function signal, the circuit noise and the parameter error for determining the correction coefficient obtained with the circuit noise, the parameter error and the received signal, and means for transferring, as the said second function, an estimated characteristic value in the circuit noise estimation circuit when the circuit noise formed in the circuit noise estimation circuit is smaller than the residual echo signal, wherein the said estimated charcteristic of the echo path is corrected in accordance with the result of multiplication of the amount of correction and the correction coefficient.

* * * * *